US009124992B2

(12) United States Patent
Jang

(10) Patent No.: US 9,124,992 B2
(45) Date of Patent: Sep. 1, 2015

(54) WIRELESS IN-THE-EAR TYPE HEARING AID SYSTEM HAVING REMOTE CONTROL FUNCTION AND CONTROL METHOD THEREOF

(71) Applicant: Algor Korea Co., Ltd., Gwangju (KR)

(72) Inventor: Young Soo Jang, Gwangju (KR)

(73) Assignee: ALGOR KOREA CO., LTD., Gwangju (KR)

( * ) Notice: Subject to any disclaimer, the term of this patent is extended or adjusted under 35 U.S.C. 154(b) by 124 days.

(21) Appl. No.: 13/949,425

(22) Filed: Jul. 24, 2013

(65) Prior Publication Data

US 2014/0029777 A1    Jan. 30, 2014

(30) Foreign Application Priority Data

Jul. 27, 2012    (KR) .................. 10-2012-0082438

(51) Int. Cl.
*H04R 25/00* (2006.01)
*G08C 17/02* (2006.01)
*H04M 1/725* (2006.01)

(52) U.S. Cl.
CPC ............. *H04R 25/554* (2013.01); *G08C 17/02* (2013.01); *H04R 25/558* (2013.01); *G08C 2201/93* (2013.01); *H04M 1/72533* (2013.01); *H04R 25/552* (2013.01); *H04R 2225/025* (2013.01); *H04R 2225/59* (2013.01); *H04R 2225/61* (2013.01)

(58) Field of Classification Search
CPC ........................... H04R 25/00; H04R 2225/00
USPC ..................... 381/315, 105, 77, 79
See application file for complete search history.

(56) References Cited

FOREIGN PATENT DOCUMENTS

KR    10-2001-0008008    2/2001

*Primary Examiner* — Paul S Kim
*Assistant Examiner* — Sabrina Diaz
(74) *Attorney, Agent, or Firm* — Kile Park Reed & Houtteman PLLC

(57) ABSTRACT

A wireless ITE (In-The-Ear) type hearing aid system having a remote control function, is provided, which includes: left and right hearing aids respectively inserted into ears and controls individually built-in features depending on a remote control signal applied in a near field magnetic induction (NFMI) method; a smart device that individually remote controls functions; and a wireless relay module that transmits and receives the audio signals and various information signals in the NFMI method, and that processes individual remote control signals in which the individual remote control signals are transmitted from the smart device via a near field communication (NFC) method. ITE type hearing aids are configured to operate with a smartphone in a wireless communication method, to then enable the smartphone to selectively control inherent functions, and to thereby maximize the ease of operation of a hearing aid wearer.

5 Claims, 4 Drawing Sheets

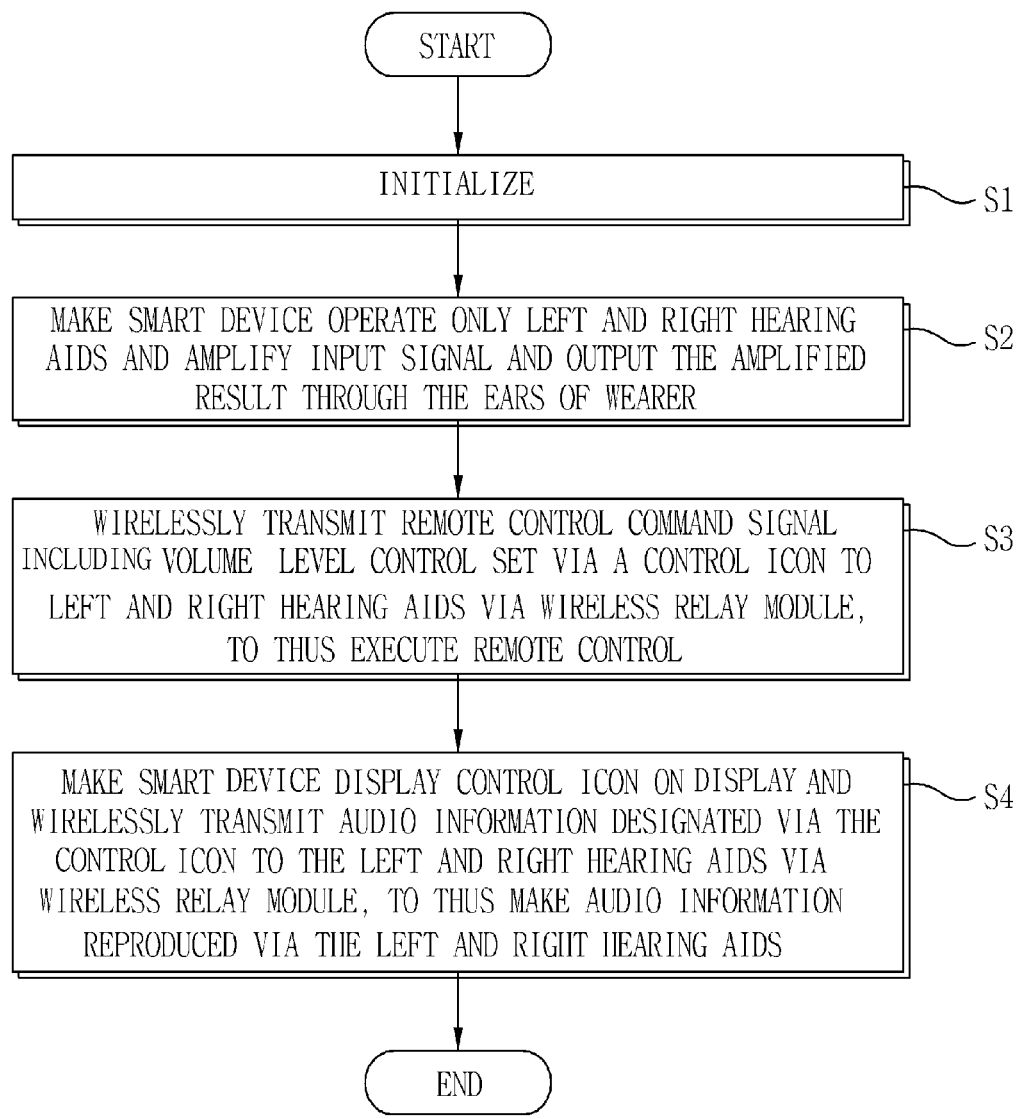

WIRELESS IN-THE-EAR TYPE HEARING AID SYSTEM HAVING REMOTE CONTROL FUNCTION AND CONTROL METHOD THEREOF

TECHNICAL FIELD

The present invention relates to a wireless ITE (In-The-Ear) type hearing aid system having a remote control function and a control method thereof, and more particularly to, a wireless ITE type hearing aid system having a remote control function and a control method thereof, in which ITE type hearing aids worn in human left and right ears are configured to operate with a smartphone in a wireless communication method by the medium of a wireless relay module, to then enable the smartphone to selectively control inherent functions including changing the volume or frequency of the left and right ITE type hearing aids, and to thereby maximize the case of operation of a hearing aid wearer.

BACKGROUND ART

Its general, the human auditory organ includes an external ear, a middle ear, an internal ear. Here, a path of enabling the human ear to hear the sound will be anatomically described. First of all, the sound energy that, is conveyed by a cascading transfer process of airborne particles is collected by the external ear at the skull and then the sound gathered through the external ear is passed to the eardrum via the external auditory canal, to thereby vibrate the eardrum. Then, the vibrations are passed to the internal ear through the middle ear. The sound energy that is passed to the internal ear moves the lymph fluid in the inside of a cochlea looking like a snail, and then thousands of tiny hair cells inside the cochlea detect movement of the lymph fluid to then be converted into the electrical energy. The converted electrical energy is transmitted to the brain via the auditory nerve to thus enable the human to detect the sound.

However, in the case that functions of transferring the sound or electrical energy do not smoothly facilitate from the external ear to the auditory nerve as described above, the hearing sense degrades or impaired hearing occurs. Usually, in the case of these patients, the hearing aids are essentially used in order to compensate for the sound by converting the sound into the electrical energy. These hearing aids are devices intended to amplify or vary the sound of the band which can be heard by persons of the normal auditory sense, and thus enable persons of the abnormal auditory sense to perceive the sound in the same manner as those of the persons of the normal auditory sense. However, since the hearing aids are small compact devices enough to wear the hearing aids in or after the ears of wearers during use, the hearing aids should be individually programmed by experts of fitting hearing aids according to prescription in order to amplify the frequency range that is difficult for a user to recognize it before use of the hearing aids.

Here, Korean Patent Laid-open Publication No. 10-2001-0008008 whose title is "Method of automatically fitting hearing aids" published on Feb. 5, 2001 is one of the prior art applications filed by the applicant Sim Yunju.

Then, a conventional hearing aid having the same structure as described above will be described with reference to FIG. 1. In FIG. 1, the conventional hearing aid includes: a microphone 71 that converts a sound which is collected by a bodily ear 70 into an electrical signal and that outputs the electrical signal; an amplifier 72 that amplifies the sound signal output from the microphone 71 into a certain level; a receiver 73 that outputs the sound signal output from the amplifier 72 into a vibration signal that can be heard by the human body, a case member 74 including the microphone 71 having the receiver 73, and the built-in amplifier 72; and a switch unit 75 that is connected to one of the amplifier 72 to thus adjust a recognition frequency manually.

In addition, a battery 76 that supplies power to internal circuitry including the amplifier 72 is housed in the case member 74.

The operation of the above-mentioned conventional hearing aid will be described below. First, the hearing aid 77 will be fitted individually by an expert of fitting hearing aids according to prescription in order to amplify the frequency range that is difficult for a user to recognize it before wearing the hearing aid in the bodily ear. After the hearing aid 77 fitted as described above is worn in the ear of the human body and then the human voice occurs outside, the human voice is collected through the microphone 71 to then enter the amplifier 72. Then, the amplifier 72 amplifies the input human voice signal into a frequency level set by the switch unit 75 to then be output to the receiver 73. Thus, the receiver 73 converts the sound signal output from the amplifier 72 into a vibration signal detected by the human ear to then be emitted into the ear of the human body and to thereby perform the normal function of the hearing aid.

However, in the case that an amplification level fitted by an expert is changed by a multiplicity of causes in the conventional hearing aid, the wearer should directly adjust the amplification level according to his or her hearing ability. In this case, when the wearer takes out the hearing aid from the ear and manipulates the switch unit with wearer's fingers, it is very difficult to manipulate the switch unit with wearer's fingers in most cases, to thereby cause it very difficult to manipulate the hearing aid and significantly decrease convenience of users of the hearing aid.

DISCLOSURE

Technical Problem

To solve the above problems, it is an object of the present invention to provide a wireless ITE (In-The-Ear) type hearing aid system having a remote control function and a control method thereof, in which a function included in the hearing aid is simply remotely controlled through a control icon implemented on a wide screen of a smartphone, without giving a burden of taking out an ITE type hearing, aid and adjusting a switch unit to an ITE type hearing aid wearer.

It is another object of the present invention to provide a wireless ITE (In-The-Ear) type hearing aid system having a remote control function and a control method thereof, in which a variety of pieces of voice information included in a smartphone is wirelessly transferred to ITE type hearing aids worn in the left and right ears through a wireless relay module to then enable a hearing aid wearer to listen to the variety of pieces of voice information, and to thus significantly improve additional applications of the ITE type hearing aids.

Technical Solution

To accomplish the above object of the present invention, there is provided a wireless ITE (In-The-Ear) type hearing aid system having a remote control function, the wireless ITE type hearing aid system comprising: left and right hearing aids that are respectively inserted into ears of a human body and controls individually built-in features depending on a remote control signal that is applied in a near field magnetic induction (NFMI) method, to thus process transmission and reception of audio signals and various information signals; a smart device that individually remote controls functions that are provided in the left and right hearing aids through an application equipped in the smart device; and a wireless relay module that transmits and receives the audio signals and various information signals with respect to the left and right hearing aids in the NFMI method, and that processes individual remote control signals for the left and right hearing aids in which the individual remote control signals are transmitted from the smart device via a near field communication (NFC) method with respect to the smart device.

According to another aspect of the present invention, there is also provided a control method of controlling a wireless ITE (In-The-Ear) type hearing aid system having a remote control function, the control method comprising: a first process wherein a wireless relay module is in standby mode and only left and right hearing aids operate to amplify an input signal and then output the amplified result to wearer's ears in the case that a smart device is set to be in a regular hearing aid mode through a dedicated application, a second process wherein the smart device displays a control icon on a display in the case that the smart device is set to be in a hearing aid function control mode during the first process, and then wirelessly transmits a remote control command signal including a volume level control that is set via the control icon to the left and right hearing aids via the wireless relay module, to thereby perform a remote control; and a third process wherein the smart device displays another control icon on the display in the case that the smart device is set to be in a music information transfer function during the second process, and then wirelessly transmits music information designated via the control icon to the left and right hearing aids via the wireless relay module, to thereby make the music information reproduced via the left and right hearing aids.

Advantageous Effects

As described above, the present invention provides an effect that ITE type hearing aids worn in human left and right ears are configured to operate with a smartphone in a wireless communication method by the medium of a wireless relay module, to then enable the smartphone to selectively control inherent functions including changing the volume or frequency of the left and right ITE type hearing aids, and to thereby maximize the ease of operation of a hearing aid wearer.

In addition, the present invention provides a wireless ITE (In-The-Ear) type hearing aid system having a remote control function and a control method thereof, in which a variety of pieces of voice information included in a smartphone is wirelessly transferred to ITE type hearing aids worn in the left and right ears through a wireless relay module to then enable a hearing aid wearer to listen to the variety of pieces of voice information, and to thus significantly improve additional applications of the ITE type hearing aids.

DESCRIPTION OF DRAWINGS

The above and other objects and advantages of the present invention will become more apparent by describing the preferred embodiment thereof in detail with reference to the accompanying drawings in which:

FIG. 4 is a flowchart view for explaining a control method of controlling a wireless ITE (In-The-Ear) type hearing aid system having a remote control function according to the present invention.

BEST MODE

Hereinbelow, a wireless ITE (In-The-Ear) type hearing aid system having a remote control function and a control method thereof, according to the present invention will be described with reference to the accompanying drawings.

Figure 1:
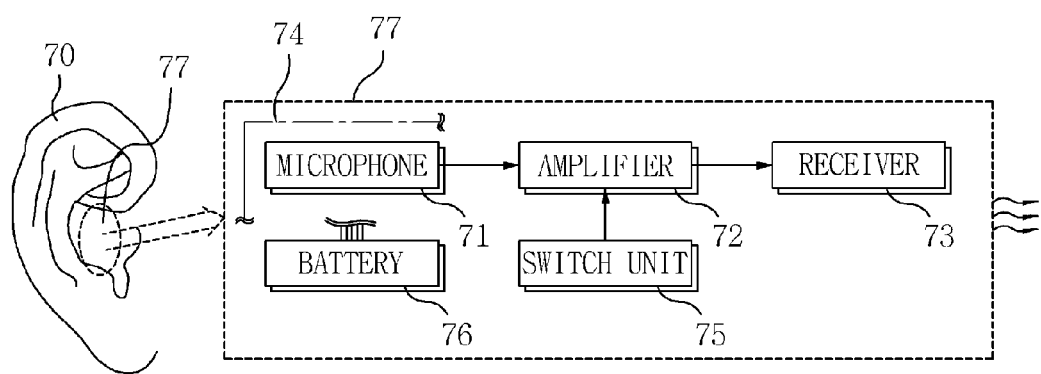
FIG. 1 is a block diagram illustrating a conventional hearing aid.
Figure 2:
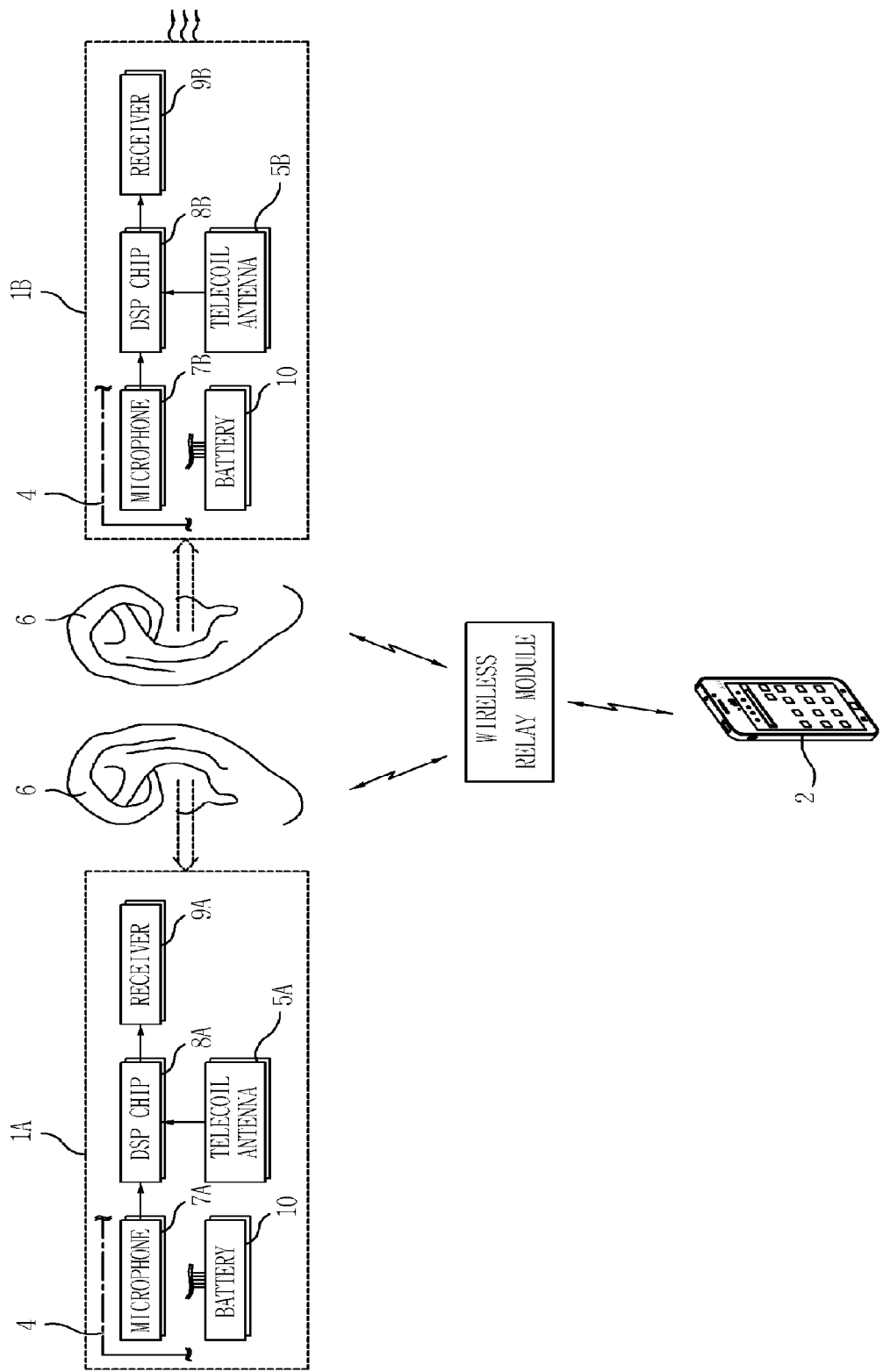
FIG. 2 is a block diagram schematically illustrating a hearing aid system according to the present invention.
Figure 3:
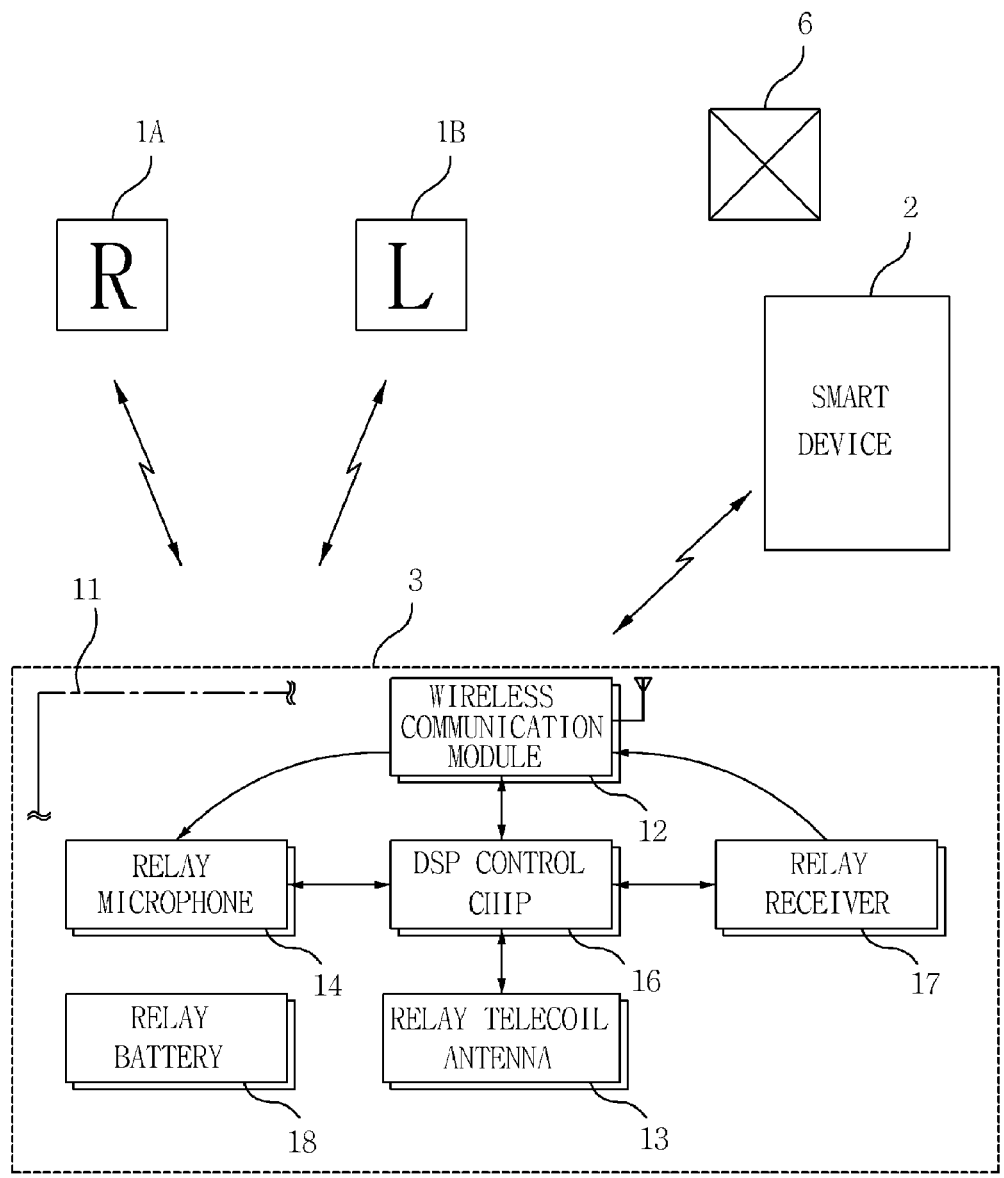
FIG. 3 a block diagram schematically illustrating a wireless relay module in a hearing aid system according to the present invention.

As shown in FIG. 2, a wireless ITE (In-The-Ear) type hearing aid system having a remote control function according to the present invention, includes: left and right hearing aids 1A and 1B that are respectively inserted into ears of a human body and controls individually built-in features depending on a remote control signal that is applied in a near field magnetic induction (NFMI) method, to thus process transmission and reception of audio signals and various information signals; a smart device 2 that individually remote controls functions that are provided in the left and right hearing aids 1A and 1B through an application equipped in the smart device 2; and a wireless relay module 3 that transmits and receives the audio signals and various information signals with respect to the left and right hearing aids 1A and 1B in the NFMI method, and that processes individual remote control signals for the left and right hearing aids 1A and 1B in which the individual remote control signals are transmitted from the smart device 2 via a near field communication (NFC) method with respect to the smart device 2.

Here, the smart device 2 includes a personal computer (PC), a smart phone and a smart pad, which is equipped with a dedicated application that individually controls functions included in the left and right hearing aids 1A and 1B via a control icon.

In addition, each of the left and right hearing aids 1A and 1B includes: an antenna 5A or 5B that is provided at one side of a hearing aid case 4, and that executes the NFC method by the NFMI principle; a microphone 7A or 7B that is provided at one side of the hearing aid case 4, to thus convert a sound signal that is collected by one ear 6 of the human body into an electrical signal to then be output, a digital signal processor (DSP) chip 8A or 8B that amplifies the signal output from the microphone 7A or 7B into a frequency level set according to the remote control signal of the smart device 2 in which the remote control signal of the smart device 2 is wirelessly transmitted and received via the antenna 5A or 5B, to then be output, and that transmits the signal collected by the microphone 7A or 7B to the wireless relay module 3 via the antenna 5A or 5B or receive various pieces of audio information included in the smart device 2 via the wireless relay module 3 to then process the received various pieces of audio information into a pulse code modulation (PCM) signal to then be output; a receiver 9A or 9B that converts the output signal of the DSP chip 8A or 8B into a vibration signal that can be heard by the human body, to then output the vibration signal; and a battery 10 that is provided at one side of the hearing aid case 4 and supplies power to internal circuitry including the DSP chip 8A or 8B.

In addition, the wireless relay module 3 includes: a wireless communication module 12 that is provided at one side of a case member 11 and that wirelessly signal-processes the individual remote control signals for the left and right hearing aids 1A and 1B and the variety of pieces of the audio information that is provided on the smart device 2 in which the individual remote control signals and the variety of pieces of the audio information are transmitted from the smart device 2 via the NFC method with respect to the smart device 2; a relay telecoil antenna 13 that is provided at one side of the case member 11 and that is configured into a coil form that executes the NFC method with respect to the left and right hearing aids 1A and 1B by the NFMI principle; a relay microphone 14 that is provided at one side of the case member 11 and that converts an input audio signal into an electrical signal to then be output; a digital signal processor (DSP) control chip 16 that transmits the individual remote control signals for the left and right hearing aids 1A and 1B and the variety of pieces of the audio information that is provided on the smart device 2 in which the individual remote control signals and the variety of pieces of the audio information are transmitted from the smart device 2 via the wireless communication module 12 to the left and right hearing aids 1A and 1B via the relay telecoil antenna 13, and transmits audio information collected by the left and right hearing aids 1A and 1B to the smart device 2 via the wireless communication module 12 to thus be transmitted to another hearing aid 15; a relay receiver 17 that converts the audio signals that is output from the DSP control chip 16 and collected by the left and right hearing aids 1A and 1B into a vibration signal that can be heard by the human body, to then transmit the vibration signal to the smart device 2 via the wireless communication module 12; and a relay battery 18 that is provided at one side of the case member 11 and that supplies power to internal circuitry including the DSP control chip 16.

Here, according to another embodiment of the present invention, the DSP control chip 16 further includes a function of audio-controlling function of the left and right hearing aids 1A and 1B according to a corresponding, control command in the case that an audio command control function is set via an application of the smart phone 2 and thereafter the control command is input via the relay microphone 14.

Further, according to another embodiment of the present invention, the smart device 2 executes a text display function that displays conversation situations by texts in which the conversation situations are made from the audio signals that are currently output from the left and right hearing aids 1A and 1B via the wireless relay module 3 and audio signals that are transmuted from a third party hearing aid 15, in the case that a text display function is set via an application of the smart phone 2.

On the following, a control method of controlling a wireless ITE (In-The-Ear) type hearing aid system having a remote control function, as constructed above, will be described.

As shown in FIG. 4, the control method according to the present invention includes: a first process S2 wherein a wireless relay module is in standby mode and only left and right hearing aids operate to amplify an input signal and then output the amplified result to wearers ears in the case that a smart device is set to be in a regular hearing aid mode through a dedicated application at an initial state S1; a second process S3 wherein the smart device displays a control icon on a display in the case that the smart device is set to be in a hearing aid function control mode during the first process S2, and then wirelessly transmits a remote control command signal including a volume level control that is set via the control icon to the left and right hearing aids via the wireless relay module, to thereby perform a remote control; and a third process S4 wherein the smart device displays another control icon on the display in the case that the smart device is set to be in a music information transfer function during the second process S3, and then wirelessly transmits music information designated via the control icon to the left and right hearing aids via the wireless relay module, to thereby make the music information reproduced via the left and right hearing aids.

In addition, the control method further includes a fourth process wherein the smart device receives audio information collected by the left and right hearing aids via the wireless relay module and transmits the received audio information to a hearing aid system of a third part, in the case that the smart device is set to be in an audio conversation transfer function during the third process S4.

Moreover, the control method further includes a fifth process wherein functions of the left and right hearing aids are audio-controlled according to a corresponding control command in the wireless relay module if the control command is input via the wireless relay module in the case that the smart device is set to be in an audio command control function during the second process S3.

Moreover, the control method further includes a sixth process wherein the smart device executes a text display function that displays conversation situations by texts in which the conversation situations are made from the audio signals that are currently output from the left and right hearing aids via the wireless relay module and audio signals that are transmitted from a third party hearing aid, in the case that the smart device is set to be in a text display function via an application of the smart phone during the fourth process.

In other words, in order to use a hearing aid system according to the present invention in a general hearing aid mode, left and right hearing aids 1A and 1B that are fitted by an expert are worn on the ears 6 of a user, and then a dedicated application is driven in a smart device 2, to thus set the general hearing aid mode in the corresponding application. Then, the smart device 2 transmits a control signal according to the set general hearing aid mode to a wireless communication module 12 of a wireless relay module 3, via a built-in wireless communication module such as Bluetooth, Wi-Fi, or ZigBee. Therefore, a DSP chip 16 of the wireless relay module 3 goes to a standby mode according to a control signal received via the wireless communication module 12 from the smart device 2. In this case, only the left and right hearing aids 1A and 1B operate, so that sound signals collected by the body's ears 6 through microphones 7A and 7B are converted into electrical signals, to then be output to DSP chips 8A and 8B. Then, the DSP chips 8A and 8B of the left and right hearing aids 1A and 1B amplify the electrical signals into a predetermined frequency amplification level by the smart device 2, to then be output to receivers 9A and 9B, respectively. Then, the receiver 9A and 9B convert the output signals of the DSP chips 8A and 8B into vibration signals that can be heard by the human body to then emit the vibration signals into the human ear, to thereby perform normal functions of the hearing aids.

On the other hand, in the case that functions of the hearing aids are desired to be remotely controlled during performing the normal functions of the hearing aids, a dedicated application is driven in a smart device 2, to thus display a control icon on a display of the smart device 2. In this case, a wearer to wear the left and right hearing aids 1A and 1B sets his or her desired volume levels through the control icon displayed on the display of the smart device 2. Then, the smart device 2 wirelessly transmits a remote, control command signal including a volume level control as set by the wearer to the left and right hearing aids 1A and 1B via the wireless relay module 3, to thereby execute a wireless remote control of the left and fight hearing aids 1A and 1B.

That is, in the case that the smart device 2 transmits a remote control command signal including a volume level control as set by the wearer, via a near field communication (NFC) method, for example, Bluetooth, the wireless communication module 12 of the wireless relay module 3 receives and processes the remote control command signal via Bluetooth, to then be input to the DSP control chip 16. Then, the DSP control chip 16 transmits the individual remote control signals to the left and right hearing aids 1A and 1B via a relay telecoil antenna 13 that operates in a near field magnetic induction (NFMI) method, in which the individual remote control signals with respect to the left and right hearing aids 1A and 1B are transmitted from the smart device 2 via the wireless communication module 12.

In this case, the smart device 2 may control the left hearing aid 1A or the right hearing aid 1B individually selectively via the wireless relay module 3, in which such a choice is produced by a combination of digital signals.

On the other hand, in the case that the individual remote control signals are transmitted to the left and right hearing aids 1A and 1B, via the relay telecoil antenna 13, the telecoil antennas 5A and 5B of the left and right hearing aids 1A and 1B process the individual remote control signals in a near field magnetic induction (NFMI) method, to then be output to the DSP chips 8A and 8B. Then, the DSP chip 8A or 8B of the left hearing aid 1A or right hearing aid 1B processes the individual remote control signals received via the telecoil antenna 5A or 5B, and then sets a volume level of a corresponding left hearing aid 1A or right hearing aid 1B according to the individual remote control signals.

In this case, the user of the hearing aids 1A and 1B may hear or perceive sound signals through the left and right hearing aids 1A and 1B worn on the ears, and execute a fitting program through the remote control process via the smart device 2.

Additionally, in the case that audio information built in the smart device 2, for example, audio signals of music CD, MP3, TV, or radio are wirelessly transmitted during the course of the individual remote control, a dedicated application is driven in the smart device 2, and then audio information built in the smart device 2, for example, audio signals of music CD, MP3, TV, or radio are transmitted to the wireless relay module 3 via the NFC method such as Bluetooth. Then, of the wireless communication module 12 of the wireless relay module 3 receives and processes audio information built in the smart device 2, for example, audio signals of music CD, MP3, TV, or radio that are transmitted from the smart device 2 via Bluetooth, to then be input to the DSP control chip 16. Then, the DSP control chip 16 receives audio information built in the smart device 2, for example, audio signals of music CD, MP3, TV, or radio via the wireless communication module 12 and transmits them to the left and right hearing aids 1A and 1B via the relay telecoil antenna 13 that operates in the NFMI method.

On the other hand, in the case that audio information built in the smart device 2, for example, audio signals of music CD, MP3, TV, or radio are transmitted to the left and right hearing aids 1A and 1B via the relay telecoil antenna 13, as described above, the telecoil antennas 5A and 5B of the left and right hearing aids 1A and 1B process the audio information built in the smart device 2 in the NFMI method to then be output to the DSP chips 8A and 8B. Then, the DSP chip 8A or 8B of the left hearing aid 1A or right hearing aid 1B receives and processes audio information built in the smart device 2, for example, audio signals of music CD, MP3, TV, or radio via the telecoil antenna. 5A or 5B, and then emits the processed result via the relay receiver 9A or 9B of the left and right hearing aid 1A or 1B, to thereby enable the wearer to listen to the corresponding information.

In addition, in the case that the smart device is set to be in an audio conversation transfer function during the process, the smart device 2 receives audio information collected by the left and right hearing aids 1A and 1B via the wireless relay module 3, and transmits the received audio information to a hearing aid system 15 of a third part, to thus execute an audio conversation transfer function.

Moreover, in the case that the smart device 2 is set to be in an audio command control function during the process, functions of the left and right hearing, aids 1A and 1B are audio-controlled according to a corresponding control command in the wireless relay module 3 if the control command is input via the wireless relay module 3.

Moreover, in the case that the smart device 2 is set to be in a text display function via an application of the smart phone during the process, the smart device 2 executes a text display function that displays conversation situations by texts in which the conversation situations are made from the audio signals that are currently output from the left and right hearing aids 1A and 1B via the wireless relay module 3 and audio signals that are transmitted from a third party hearing aid system 15, to thereby enable the user to confirm a current conversation situation in realtime by texts.

INDUSTRIAL APPLICABILITY

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The invention claimed is:

1. A wireless ITE (In-The-Ear) type hearing aid system having a remote control function, the wireless ITE type hearing aid system comprising:

left and right hearing aids that are respectively inserted into ears of a human body and controls individually built-in features depending on a remote control signal that is applied in a near field magnetic induction (NFMI) method, to thus process transmission and reception of audio signals and various information signals;

a smart device that individually remote controls functions that are provided in the left and right hearing aids through an application equipped in the smart device; and a wireless relay module that transmits and receives the audio signals and various information signals with respect to the left and right hearing aids in the NFMI method, and that processes individual remote control signals for the left and right hearing aids in which the individual remote control signals are transmitted from the smart device via a near field communication (NFC) method with respect to the smart device;

wherein each of the left and right hearing aids comprises:

an antenna that is provided at one side of a hearing aid case, and that executes the NFC method by the NFMI principle;

a microphone that is provided at one side of the hearing aid case, to thus convert a sound signal that is collected by one ear of the human body into an electrical signal to then be output;

a digital signal processor (DSP) chip that amplifies the signal output from the microphone into a frequency level set according to the remote control signal of the smart device in which the remote control signal of the smart device is wirelessly transmitted and received via the antenna, to then be output, and that transmits the signal collected by the microphone to the wireless relay module via the antenna or receive various pieces of audio information included in the smart device via the wireless relay module to then process the received various pieces of audio information into a pulse code modulation (PCM) signal to then be output;

a receiver that converts the output signal of the DSP chip into a vibration signal that can be heard by the human body, to then output the vibration signal; and a battery that is provided at one side of the hearing aid case and supplies power to internal circuitry including the DSP chip.

2. The wireless ITE type hearing aid system according to claim 1, wherein the smart device comprises a personal computer (PC), a smart phone or a smart pad, which is equipped with a dedicated application that individually controls functions included in the left and right hearing aids via a control icon.

3. The wireless ITE type hearing aid system according to claim 1, wherein the wireless relay module comprises:

a wireless communication module that is provided at one side of a case member and that wirelessly signal-processes the individual remote control signals for the left and right hearing aids and the variety of pieces of the audio information that is provided on the smart device in which the individual remote control signals and the variety of pieces of the audio information are transmitted from the smart device via the NFC method with respect to the smart device;

a relay telecoil antenna that is provided at one side of the case member and that is configured into a coil form that executes the NFC method with respect to the left and right hearing aids by the NFMI principle;

a relay microphone that is provided at one side of the case member and that converts an input audio signal into an electrical signal to then be output;

a digital signal processor (DSP) control chip that transmits the individual remote control signals for the left and right hearing aids and the variety of pieces of the audio information that is provided on the smart device in which the individual remote control signals and the variety of pieces of the audio information are transmitted from the smart device via the wireless communication module to the left and right hearing aids via the relay telecoil antenna, and transmits audio information collected by the left and right hearing aids to the smart device via the wireless communication module to thus be transmitted to another hearing aid;

a relay receiver that converts the audio signals that is output from the DSP control chip and collected by the left and right hearing aids into a vibration signal that can be heard by the human body, to then transmit the vibration signal to the smart device via the wireless communication module; and a relay battery that is provided at one side of the case member and that supplies power to internal circuitry including the DSP control chip.

4. The wireless ITE type hearing aid system according to claim 3, wherein the DSP control chip further comprises a function of audio-controlling function of the left and right hearing aids according to a corresponding control command in the case that an audio command control function is set via an application of the smart device and thereafter the control command is input via the relay microphone.

5. The wireless ITE type hearing aid system according to claim wherein the smart device executes a text display function that displays conversation situations by texts in which the conversation situations are made from the audio signals that are currently output from the left and right hearing aids via the wireless relay module and audio signals that are transmitted from a third party hearing aid, in the case that a text display function is set via an application of the smart device.

* * * * *